United States Patent [19]
de Matteis et al.

[11] Patent Number: 5,495,095
[45] Date of Patent: Feb. 27, 1996

[54] USER-FRIENDLY COOKING OVEN AND METHOD OF OPERATING SAME

[75] Inventors: Michel G. de Matteis, Cambes-en-Plaine; Jean-Louis M. R. Guilgue, Beny-sur-Mer, both of France

[73] Assignee: Moulinex (Societe Anonyme), Bagnolet, France

[21] Appl. No.: 221,779

[22] Filed: Apr. 1, 1994

[30] Foreign Application Priority Data

Apr. 1, 1993 [FR] France ................. 93 03854

[51] Int. Cl.⁶ .................................................. H05B 6/68
[52] U.S. Cl. ........................... 219/720; 219/506; 219/708; 219/719; 219/702
[58] Field of Search ........................... 219/720, 719, 219/708, 702, 714, 681, 685, 506

[56] References Cited

U.S. PATENT DOCUMENTS

| | | |
|---|---|---|
| 4,405,991 | 9/1983 | Stanley . |
| 4,431,893 | 2/1984 | Levie ........................... 219/720 |
| 4,447,692 | 5/1984 | Mierzwinski . |
| 4,568,810 | 2/1986 | Carmean ....................... 219/720 |
| 5,352,874 | 10/1994 | Gong ............................ 219/720 |

FOREIGN PATENT DOCUMENTS

| | | |
|---|---|---|
| 0106898 | 5/1984 | European Pat. Off. . |
| 0176965 | 4/1986 | European Pat. Off. . |
| 0376741 | 7/1990 | European Pat. Off. . |
| 0447979 | 9/1991 | European Pat. Off. . |
| 2160694 | 12/1985 | United Kingdom . |

*Primary Examiner*—Philip H. Leung
*Attorney, Agent, or Firm*—Young & Thompson

[57] ABSTRACT

A combined oven for cooking foodstuffs having a control panel having, on the one hand, a selection device (11) for a heating sequence to be used, of a type of foodstuff and of its weight, and, on the other hand, a control device (8) connected to data processing device (9) which includes a principal computer (10) determining a heating time as a function of the selection device. The data processing device (9), on the one hand, is connected to a display device (12) and, on the other hand, includes a slave computer (13) connected to the principal computer (10) by a bidirectional bus (14) and to which are connected the selection device (11), a storage memory (15) containing information selectable by the selection device (11) and the display device (12) to display the selectable data.

5 Claims, 2 Drawing Sheets

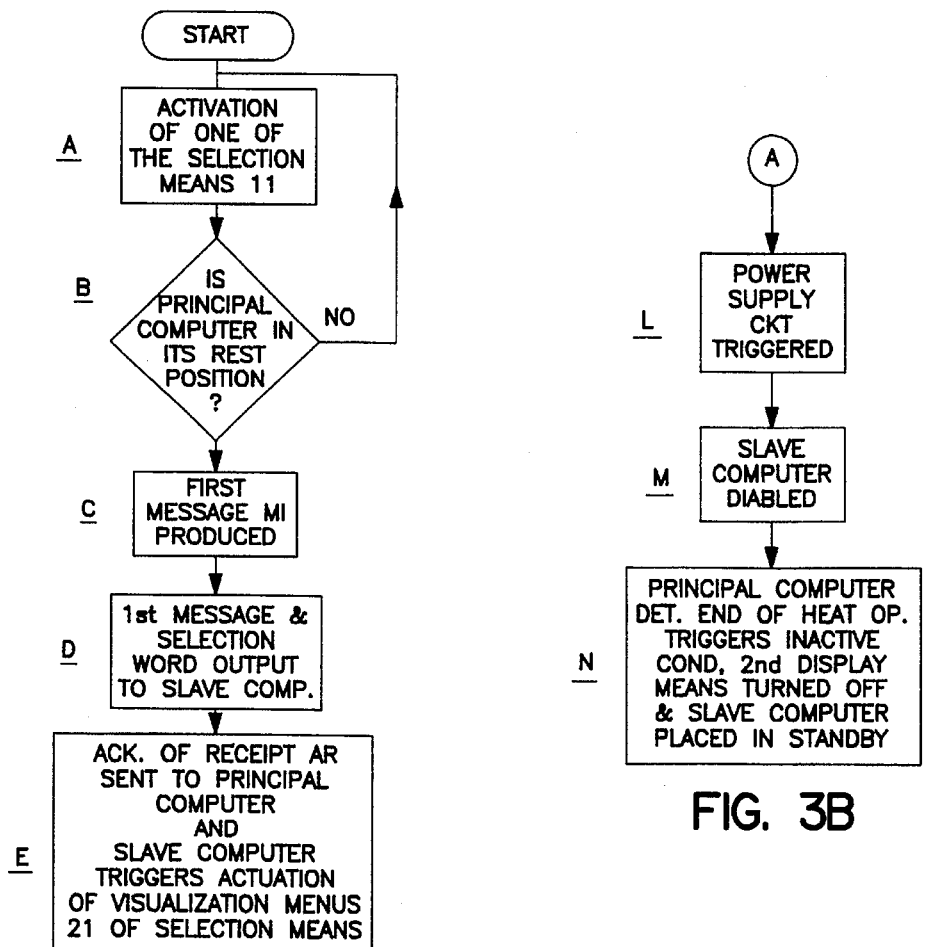
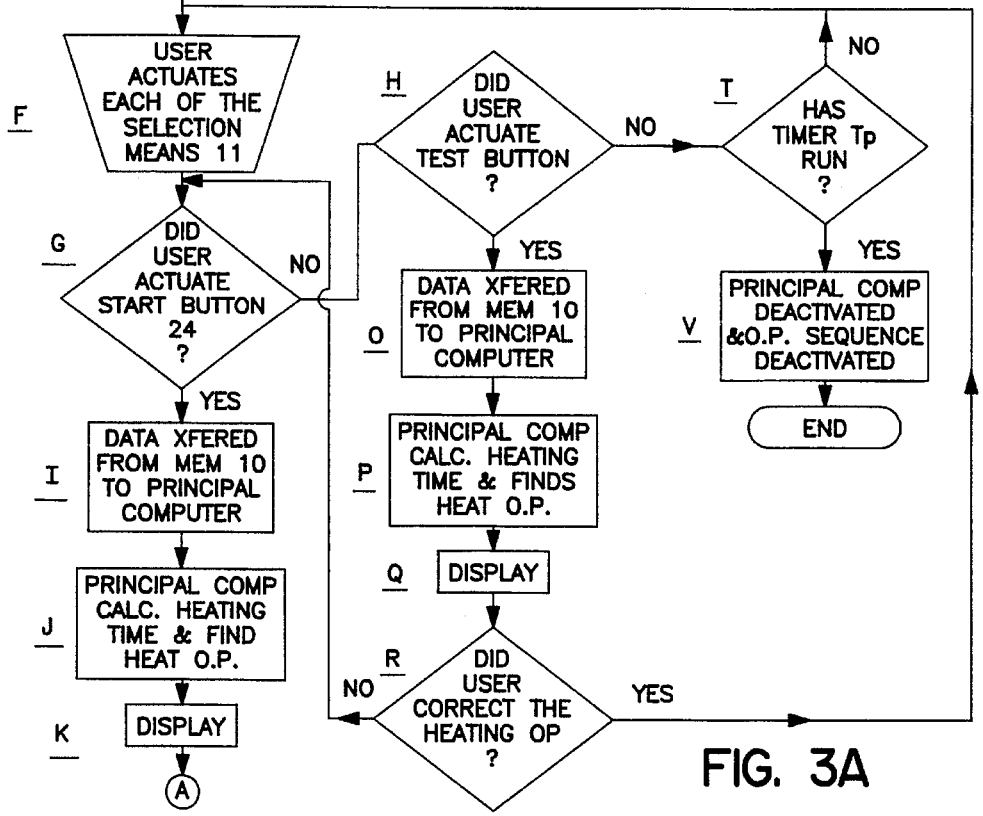
FIG. 3B
FIG. 3A

USER-FRIENDLY COOKING OVEN AND METHOD OF OPERATING SAME

BACKGROUND OF THE INVENTION

1. Field of the Invention

The invention relates to an oven comprising a cooking chamber for food comprising an electric resistance browning device, a rotatable heating device and a device for the generation of microwave energy, a supply circuit to supply the electric resistance browning device and the rotatable heating device and the device for the generation of microwave energy, and a control panel which comprises, on the one hand, selection means permitting choosing a heating sequence to be used in said chamber and turning on the browning device and the rotatable heating device and the device for the generation of microwave energy, and to take account of the type of foodstuff and its weight, and, on the other hand, control means connected to data processing means which comprise a principal computer determining a heating time as a function of the selection means and which triggers the operation of the supply circuit.

2. Description of the Related Art

In known cooking ovens of this type, when the user wishes to treat a particular foodstuff by a predetermined heating operation, the user must enter a manual program requiring complex manipulation. On the other hand, during manual programming, the user must act cautiously and thoroughly to take account of all the information necessary for the establishment of the predetermined heating operation. Thus, the control panel of a cooking oven is generally difficult to read and often requires the use of an explanation of use to establish the correspondence between pictorial symbols disposed on the control panel to be selected and the significance of these symbols. Finally, the user must generally refer to cookbooks for certain information to enter by the selection means.

SUMMARY OF THE INVENTION

The object of the invention is to overcome the above drawbacks by means of a cooking oven containing all the information necessary to establish a predetermined heating operation so as to improve the user-friendliness of the control panel of said cooking oven.

According to the invention, the data processing means, on the one hand, are connected to display means showing the calculated heating time as well as a representation of the browning device and the rotatable heating device and the device for the generation of microwaves activated during triggering of the supply circuit, and, on the other hand, comprising a slave computer connected to the principal computer by a bidirectional bus and to which are connected the selection means, a storage memory containing data selectable by the selection means and said visualization means to display the selected information.

Thanks to the cooking oven according to the invention, a user, by simple manipulation of the selection means, can see displayed on the visualization means all the information necessary for the operation of an oven in which is inserted a foodstuff to be treated. During programming said oven, the user selects, by the selection means, a heating sequence, a type of foodstuff and the weight of the foodstuff and then triggers the control means to verify and modify as needed the selected data. This programming is simple for the user who thus has, in the same oven, all the data to obtain optimum operation of the oven, said programming being facilitated by a light and the simplicity of the control panel. On the other hand, the user need no longer be concerned with the selection of the heating time. The computers integrated within the cooking oven take into account the information selected by the selection means and determine, without intervention of the user, the optimum heating operation to be used on the foodstuff. In this way, the user has a user-friendly control panel with which he can interact without reference to external sources of information.

BRIEF DESCRIPTION OF THE DRAWINGS

The characteristics and advantages of the invention will become apparent from the description which follows, by way of non-limiting example, with reference to the accompanying drawings, in which:

FIGS. 3A and 3B are schematic block diagrams showing the process of operation of the cooking oven according to the invention.

DETAILED DESCRIPTION OF THE INVENTION

Figure 1:
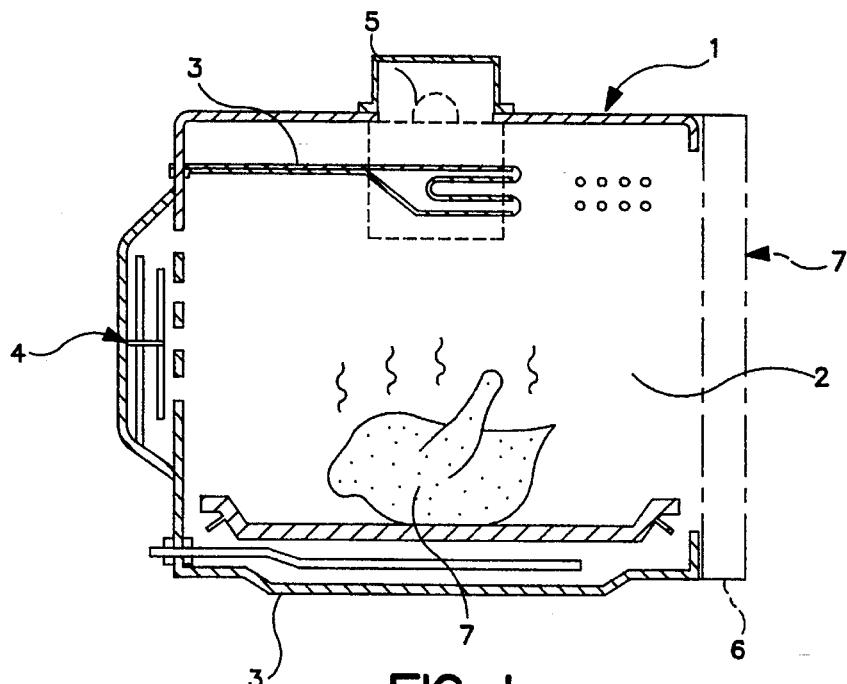
FIG. 1 is a cross-sectional view of a cooking oven of conventional type showing various heating devices.

According to FIG. 1, the cooking apparatus 1 such as a cooking oven comprises a cooking chamber 2 comprising an electric resistance browning device 3, a rotating heating device 4 and a device 5 for the generation of microwave energy and a supply circuit (not shown) to supply the browning device 3 and the rotating heating device and the device 5 for the generation of microwave energy. The cooking chamber 2 is delimited by a door 6 shown in broken lines and disposed on the forward surface 7 of the cooking oven. This forward surface 7 comprises a control panel (not shown) comprising selection means permitting on the one hand choosing a heating sequence to be used in the chamber 2, said heating sequence optionally involving the browning device and the rotating heating device and the device for the generation of microwave energy, and, on the other hand, to take account of the foodstuff and its weight, and control means 8.

Figure 2:
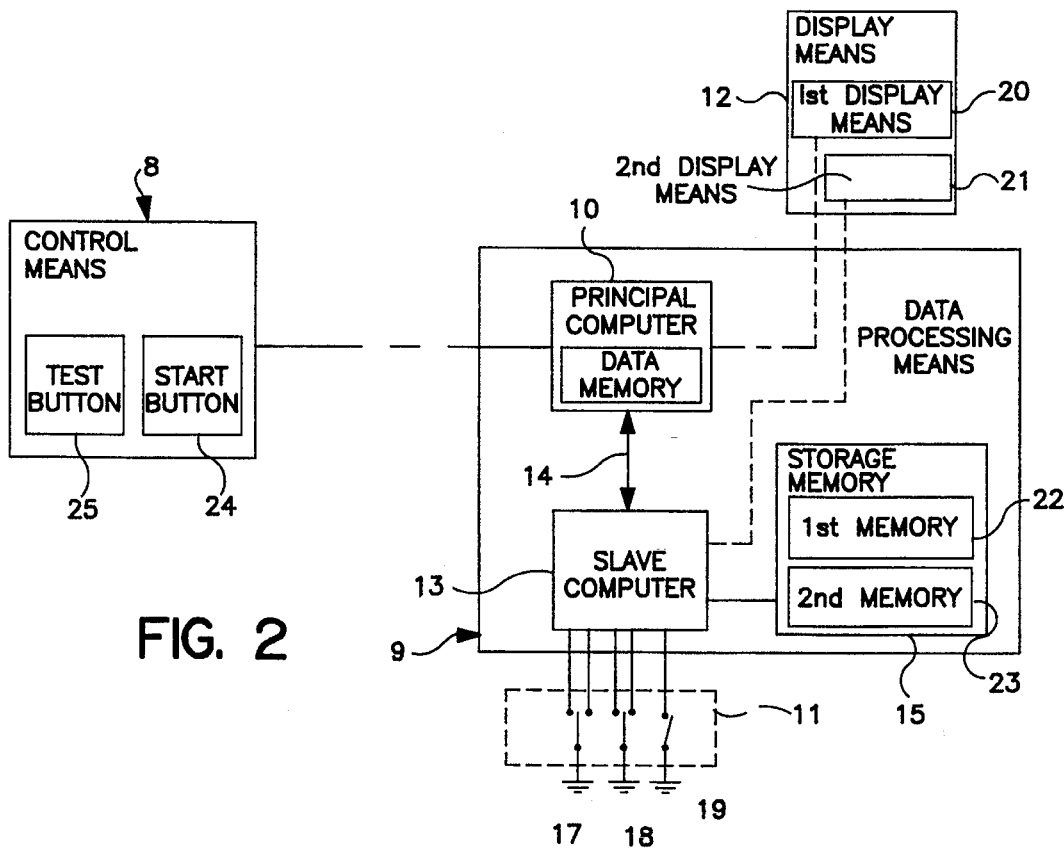
FIG. 2 is a schematic representation showing the data processing means according to the invention, adapted to be used in a cooking oven as shown in FIG. 1.

According to FIG. 2, the control means 8 are connected to data processing means 9 which comprise a principal computer 10 determining the heating time as a function of the selection means 11 and a data memory 10' and which triggers the operation of the supply circuit. The principal computer 10 of the data processing means 9 is connected to a display means 12 displaying the calculated heating time as well as a representation of the browning device 3 and the rotating heating device 4 and the device 5 for the generation of microwave energy actuated upon triggering the supply circuit. The data processing means 9 also comprise a slave computer 13 connected to the principal computer 10 by a bidirectional bus 14 and to which are connected the selection means 11, a storage memory 15 containing data selectable by the selection means 11 and the display means 12 for displaying selectable information.

The display means 12 comprises, for example, a first display means 20 connected to the principal computer 10 and a second display means 21 connected to the slave computer 13.

The selection means 11 comprise a selection means for the type of food 17, selection means for the weight of the selected type of food 18 and a selection means of a heating sequence 19 to be used for each type of foodstuff.

Said selection means 11 are for example rotatable encoders of known type which, by their actuation, permit the progressive display on the visualization means 12 of certain information contained in the storage memory 15 and the information to be selected.

The storage memory comprises a first memory 22 comprising n cards each containing, in the language of a certain country, a predetermined list of a certain number of types of foodstuffs, a particular number i of heating sequences to be used for each type of foodstuff, code numerals $\alpha_i$ each corresponding to a type of foodstuff as a function of a predetermined heating sequence, and a second memory 23 containing values of weights of foodstuffs. The data memory of the principal computer 10 comprises, among other things, a selection word for a language of a particular country. This selection word of a language ensures, when it is sent to the slave computer, the selection of one of n cards in which the user in a particular country is capable of choosing a predetermined type of foodstuff.

The selection means 19 for a heating sequence permit, in this embodiment, selecting either a defrosting sequence or a reheating sequence, or a cooking sequence or a cooking-browning-searing-roasting sequence. The number i of selectable heating sequences is therefore four sequences but this number is not limiting.

The control means 8 comprise, on the one hand, a start button 24 to trigger the data processing means which actuate the operation of the supply circuit and, on the other hand, a test button 25 to control the result produced by the processing means according to the information selected with the help of the selection means.

So as to illustrate the operation of the oven, there are shown in FIGS. 3A and 3B operational diagrams corresponding to the process for use of the cooking oven according to the invention.

At the outset, after the user has placed the foodstuff 7 to be treated in the cooking chamber 2, the user activates any one of the selection means 11, shown at A. The slave computer 13 sends an operation signal to the principal computer 10 through the bus 14, shown at B. If the principal computer 10 is not in its rest position, one returns to the initial position "START". If the principal computer is in its rest position, said principal computer 10 triggers by a subprogram the production of a first message $M_1$, shown at C, containing a start order. The principal computer 10 outputs toward the slave computer 13 said first message $M_1$ as well as a selection word of a language of a particular country, shown at D, the slave computer 13 sends, after reception of the first message $M_1$ and of the selection word for a language, acknowledgment of receipt AR to the principal computer 10, the slave computer 13 triggers the actuation of the visualization means 21 of the selection means 11, shown at E.

Next the user successively actuates each of the selection means 11, shown at F, to enter the type of foodstuff to be treated, the weight of said foodstuff and the heating sequence to be used on said foodstuff. At each actuation of the selection means, the second visualization means 21 displays one of the selectable data by said used selection means.

In the next instance, after programming by the user of all the information selectable by all the selection means 11, the user actuates either the start button 24, shown at G, or the test button 25, shown at H.

If the user actuates the start button 24, the principal computer 10 transfers into its data memory 10', shown at I, the data from the selection means 11 and contained in the storage memory 15 connected to the slave computer 13. The principal computer 10 calculates the heating time to be used and finds the corresponding heating operation, shown at J. The first visualization means 20 displays said heating time as well as a representation of the browning device and the rotating heating device and the device for the generation of microwaves, if appropriate, adapted to operate upon triggering the supply circuit, shown at K. The principal computer 10 triggers the operation of the supply circuit, shown at L, and disables the slave computer 13, shown at M. The principal computer 10 determines the end of the heating operation, triggers the inactive condition, and sends to the slave computer 13 an end of operation message shutting off the second display means 21 and placing in stand-by condition said slave computer 13, shown at N.

If the user actuates the test button 25, the principal computer 10 transfers into its data memory 10', shown at O, the data from the selection means 11 and contained in the storage memory 15. The principal computer 10 calculates the heating time to be used and finds the corresponding heating operation, shown at P. The first visualization means 20 displays said calculated heating time as well as a representation, if appropriate, of the browning device and the rotating heating device and the device for the generation of microwave energy adapted to be placed in operation during the heating operation determined by the treatment means, shown at Q. If the user does not actuate the test button 25, the principal computer 10 triggers the running of a timer Tp, shown at T. If the timer $T_p$ runs, the principal computer 10 is deactivated and interrupts the operational sequence, shown at V. If the timer Tp does not run, the user selects the selection means, shown at F.

The user thus verifies, before operation of the start button 24, the heating operation determined by the treatment means 9. The user corrects as may be needed said heating operation, shown at R. Thus, the slave computer and the principal computer 10 being always active during a time t, the user can modify, by the selection means 11, the selected heating operation before actuation of the start button 24. In this way, at any moment before the actuation of the start button, the user controls the heating operation to be applied to the foodstuff placed within the cooking chamber 2.

Thanks to the cooking oven according to the invention, a user triggers and controls with simplicity a heating operation of a foodstuff placed within the cooking chamber. On the other hand, the display means 12 for the different calculated and selected data ensures to the user that said heating operation will be followed while leaving him free to intervene.

We claim:

1. Oven comprising a cooking chamber (2) for foodstuffs comprising:

an electric resistance browning device (3), a rotating heating device (4) and a device (5) for the generation of the microwave energy, a supply circuit to supply the electric resistance browning device and the rotating heating device and the device for the generation of microwave energy, a control panel comprising selection means (11) for selecting a heating sequence to be used in said chamber (2) and for causing at least one of the browning device (3) and the rotating heating device (4) and the device (5) for the generation of microwave energy to operate, and for taking into account a type of foodstuff and a weight of said foodstuff, said control panel also comprising a control means (8) connected to a data processing means (9) comprising a principal computer (10) determining a heating time as a function of the selection means and which triggers an operation of the supply circuit, the data processing means (9) being connected to display means (12) displaying a calculated heating time as well as a representation of at least one of the browning device (3) and the rotating heating device (4) and the device (5) for the generation of microwave energy actuated upon triggering the supply circuit, said data processing means comprising a slave computer (13) connected to the principal computer (10) by a bidirectional bus (14) to which are connected said selection means (11), wherein said data processing means (9) comprise a storage memory (15) which is connected to the slave computer (13), and to the display means (12) to display information contained in said memory (15) and selected by the selection means (11), the storage memory containing:

n files each containing a predetermined list of a certain number of types of foodstuffs in different languages;

a particular number i of heating sequences to be applied to each type of foodstuff;

code number $\alpha_1$ each corresponding to a particular type of foodstuff as a function of a predetermined heating sequence.

2. Cooking oven according to claim 1, wherein said control means (8) comprise a start button (24) to trigger the actuation of the data processing means and a test button (25) to control the processing means.

3. Method of operating an oven comprising a cooking chamber (2) for foodstuffs comprising an electric resistance browning device (3), a rotating heating device (4), and a device (5) for the generation of microwave energy, a supply circuit to supply the electric resistance browning device and the rotating heating device and the device for the generation of microwave energy, a control panel comprising selection means (11) for selecting a heating sequence to be used in said chamber (2) and for causing at least one of the browning device (3) and the rotating heating device (4) and the device (5) for the generation of microwave energy to operate, and for taking into account a type of foodstuff and a weight of said foodstuff, said control panel also comprising a control means (8) connected to a data processing means (9) comprising a principal computer (10) determining a heating time as a function of the selection means and which triggers an operation of said supply circuit, the data processing means (9) being connected to a display means (12) displaying a calculated heating time as well as a representation of at least one of the browning device (3) and the rotating heating device (4) and the device (5) for the generation of microwave energy actuated upon triggering said supply circuit, said data processing means comprising a slave computer (13) connected to the principal computer (10) by a bidirectional bus (14) to which are connected said selection means (11), said method comprising the steps of:

actuating of any one of said selection means (11) by a user;

triggering, by said control means (8) a powering of the supply of the principal computer (10) which triggers by a subprogram the production of a first message $M_1$ containing a command to start the principal computer;

sending toward the slave computer (13) said first message $M_1$ as well as a selection word;

sending, by said slave computer (13) after reception of said first message $M_1$ and of said selection word, an acknowledgement of receipt AR to said principal computer (10);

triggering, by said slave computer (13), the actuation of said display means (12) of said selection means;

during a second actuation of said selection means (11) by the user, displaying, by said visualization means (12), the type of foodstuff selected by said user, the weight of said foodstuff, as well as a predetermined heating sequence; and upon actuation by the user of one of the start button (24) and the test button (25), triggering, by said control means (8), one of a start of a predetermined heating sequence by said data processing means (9) as a function of the selection means (11), and a control of said predetermined heating sequence by said processing means (9) without starting said heating sequence, said control permitting the user to examine a selected and calculated data and, if desired, to modify the heating operation before starting the oven.

4. Method according to claim 3, further comprising the steps of:

upon the user actuating the start button (24), transferring, by said principal computer into its storage memory (15) of the data emitted by the selection means (11) and contained in the storage memory (15) connected to said slave computer (13);

computing, by said principal computer (10), of the heating time to be used and corresponding to the predetermined heating sequence;

displaying, by said display means, said heating time, as well as a representation of at least one of the browning device, the rotating heating device, and the device for the generation of microwave energy operating for said selected heating sequence;

triggering, by said principal computer, of the operation of the supply circuit and an inhibition of said slave computer;

determining, by said principal computer, of the end of the selected heating sequence;

triggering, by said principal computer, of its standby condition;

sending, by said principal computer to said slave computer, an end of operation message which turns said second display means off and places said slave computer in a standby condition.

5. Method according to claim 3, further comprising the steps of:

upon the user actuating the test button, transferring, by said principal computer, into its data memory, data emitted from said selection means and contained in the storage memory connected to said slave computer;

calculating, by said principal computer, the heating time to be used for the foodstuff to be treated;

displaying, by said first visualization means, said calculated heating time as well as a representation of at least one of said browning device, said rotating heating device, and said device for the generation of microwave energy placed in operation during the selected heating operation by said processing means, said principal computer and said slave computer being active during a time t during which the user can one of modify, cancel and trigger the heating operation predetermined by said data processing means, said principal computer and said slave computer returning to a, standby condition if no action is triggered.

* * * * *